United States Patent [19]
Scullin et al.

[11] Patent Number: 5,423,590
[45] Date of Patent: Jun. 13, 1995

[54] TRANSPORT TRAILER AND METHOD FOR TRANSPORTING CYLINDRICAL CONTAINERS

[76] Inventors: Jan J. Scullin; Nelson Johnson, both of P.O. Box 32605, Charlotte, N.C. 28232-2605

[21] Appl. No.: 95,924

[22] Filed: Jul. 21, 1993

[51] Int. Cl.⁶ .............................................. B60P 7/06
[52] U.S. Cl. ..................... 296/181; 410/33; 410/42
[58] Field of Search ............ 296/1.1, 181, 37.6; 410/33, 36, 42, 47, 49, 50

[56] References Cited

U.S. PATENT DOCUMENTS

| | | | |
|---|---|---|---|
| 1,833,764 | 11/1931 | Tremblay et al. | 410/36 |
| 1,854,711 | 4/1932 | Mayer | 410/42 X |
| 2,016,461 | 10/1935 | Spoor | 410/33 |
| 2,901,283 | 8/1959 | Curell | 296/181 |
| 3,752,086 | 8/1973 | Smith | 410/42 |
| 4,061,391 | 12/1977 | Violette | 410/36 X |
| 4,529,345 | 7/1985 | Van Gompel | 410/42 |
| 4,572,716 | 2/1986 | West | 410/36 |
| 5,154,556 | 10/1992 | Wappel | 410/42 X |

Primary Examiner—Dean J. Kramer
Attorney, Agent, or Firm—Shefte, Pinckney & Sawyer

[57] ABSTRACT

An improved transport trailer is configured for transporting generally cylindrical drum-like containers and includes spacer members which abut the containers in a region intermediate the annular projecting surfaces of the container. The spacer members include a smooth surface for prevention of damage to the container surface and are disposed within the trailer so that the container contact surface is spaced a distance away from the walls of the trailer that is greater than the projecting distance of the annular projecting members of the containers to prevent contact of the annular projecting surfaces with the walls of the trailer. The containers are arranged within the trailer in a staggered pattern to maximize the utilization of cargo space within the trailer and, in cooperation with the spacer members, to substantially prevent movement of the containers during transportation.

10 Claims, 4 Drawing Sheets

TRANSPORT TRAILER AND METHOD FOR TRANSPORTING CYLINDRICAL CONTAINERS

BACKGROUND OF THE INVENTION

The present invention relates generally to improvements in cargo trailers and more specifically to an improved cargo trailer and method for transporting cylindrical containers.

Cylindrical storage containers, such as 55-gallon drums or barrels, are used extensively in industries which must store and transport liquids in relatively substantial quantities for on-site use. The containers typically have two annular ring-like surfaces projecting outwardly from the side walls thereof in generally spaced parallel relation. These annular projections, commonly known as "hoops" in the container industry, allow a container to be positioned on its side for rolling movement thereof. The projecting hoops provide support to space the walls of the container above the ground and thereby reduce the surface contact area, and the rolling resistance, thus enhancing the ability of the container to be rolled by hand.

After the containers are manufactured, they must be transported to the end user where they are filled with material for distribution thereof. Typically, the newly manufactured containers are individually loaded onto conventional transport trailers for transport to the end user. The transport trailers thus utilized typically consist of a generally planar cargo support surface having a box-like cover attached thereto and mounted to a plurality of wheels for rolling movement thereof. The box-like cover typically consists of a plurality of planar wall members which are supported internally by a plurality of vertically oriented support members arranged around the periphery of the cargo support surface in generally spaced parallel relation.

These conventional cargo trailers are often constructed for transporting goods of no particular type and generally consist of no more than a cargo box on wheels. Accordingly, if the containers are transported in such a conventional trailer, there is usually a spacing between the containers and the side walls, and the containers can collide with the walls of the trailer and with each other, which can damage either the container or the trailer, or both. Further, the movement of the trailer along a highway tends to cause the containers to vibrate and rotate which can cause scraping of the containers against one another and thereby cause degradation of the surface appearance of the newly manufactured containers, and the containers can eventually rub holes in the side walls of the cargo trailer.

SUMMARY OF THE INVENTION

It is accordingly an object of the present invention to provide an apparatus and method for transporting cylindrical containers in a transport trailer which maximizes the use of the trailer space while minimizing the possibility of damage to the containers being transported and to the transport trailer.

More specifically, it is an object of the present invention to provide an improvement in a transport trailer of the type having a generally planar covered cargo support surface for mounting to a plurality of wheels for rolling movement thereof, the cover being generally box-like and including a plurality of generally planar, vertically oriented wall members supported internally by a plurality of upstanding support members disposed around the periphery of the support surface in spaced, generally parallel relation. The improvement enhances the ability of the trailer to transport generally cylindrical storage containers of type having at least two annular raised ring-like surfaces projecting a predetermined distance outwardly from the sides of the containers in spaced parallel relation to each other and to the ends of the containers. The improvement includes a spacer arrangement having a container contact surface disposed intermediate the upstanding support members and spaced a predetermined distance away from the trailer wall members, the predetermined distance being greater than the predetermined projection distance of the annular projecting surfaces. The spacer arrangement is configured and positioned to contact the containers intermediate the ring-like members for positioning the containers in a predetermined arrangement within the trailer.

It is preferred that the container contact surface be formed of a material which is sufficiently smooth to permit the containers to move thereacross in contact therewith with substantially no degradation of the surface appearance of the container. It is further preferred that the spacer arrangement include a plate having the container contact surface affixed thereto and a flange projecting from each end thereof, each flange being adapted for mounting to a vertical support member, the plate extending therebetween in a disposition sufficient to engage a container intermediate the ring-like projecting surfaces. Preferably, a plurality of such plates are disposed within the interior of the trailer to extend between the vertical support members at positions corresponding to the area intermediate the ring-like projecting surfaces of a plurality of containers positioned in a predetermined arrangement.

It is preferred that the predetermined arrangement include positioning the containers on the cargo support surface in a staggered pattern arrangement for minimizing the space between the adjacent containers. The staggered pattern arrangement preferably includes the containers being arranged in a plurality of adjacent rows with each row being disposed in spaced parallel relation to an adjacent row such that imaginary lines connecting the centers of any two containers in a row and the center of the container in an adjacent row which is closest to the two containers form an equilateral triangle, thereby substantially eliminating the space between all the containers within the trailer and maximizing the number of containers that can be transported in the trailer.

According to the preferred method of the present invention, the containers are transported in a transport trailer by first mounting a spacer arrangement to the vertical support members to extend therebetween at a disposition sufficient to engage the containers intermediate the annular projecting surfaces to prevent the containers from abutting the trailer wall members, and arranging a plurality of containers within the trailer in a predetermined staggered pattern with the area of the containers intermediate the annular projecting surfaces in abutment with the spacer arrangement and with no significant spacing between adjacent containers to substantially prevent movement of the containers during transportation thereof to a destination. Preferably, the step of arranging the containers in a predetermined staggered pattern includes positioning the containers on the support surface in the above-discussed pattern.

It is also preferred that the method further comprise the steps of mounting a second plurality of spacer arrangements to the vertical support members in spaced vertical relation with the other plurality of spacer arrangements and stacking a second plurality of containers on the first plurality of containers in a disposition where the second plurality of spacer arrangements can abut the stacked containers intermediate the annular projecting surfaces. By the above, the containers are held tightly in place and the aforesaid road vibrations have a substantially lessened effect resulting in less container movement and thereby less damage to both the containers and the cargo trailer.

DETAILED DESCRIPTION OF THE PREFERRED EMBODIMENT

Figure 1:
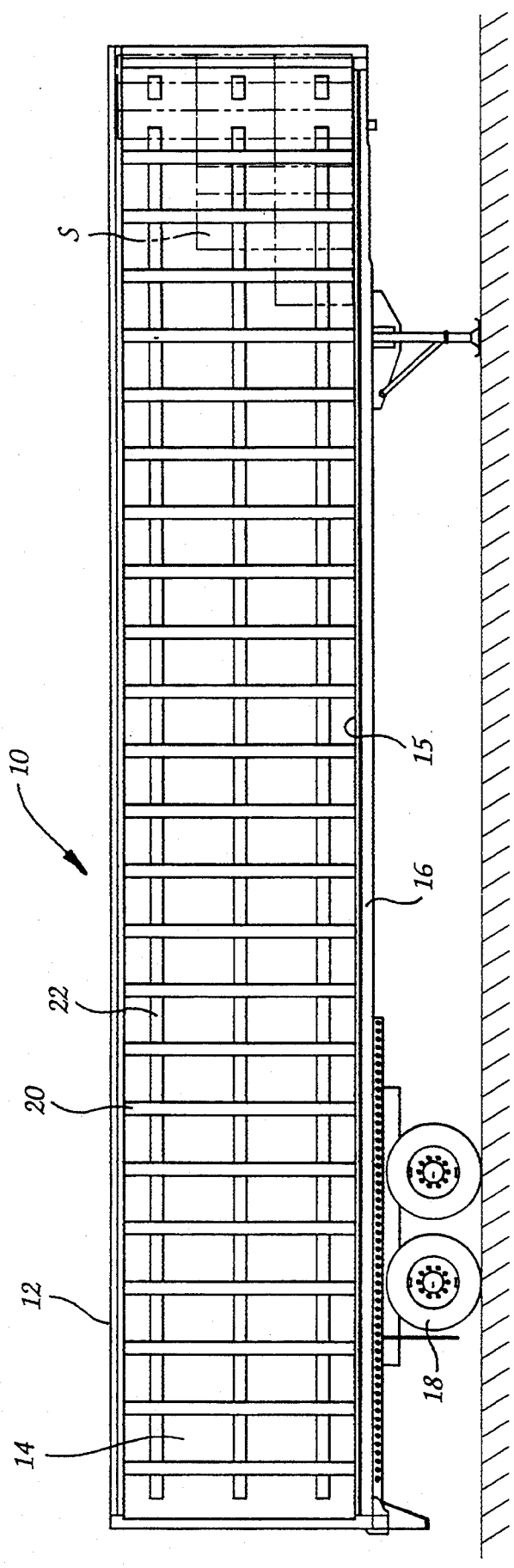
FIG. 1 is a side sectional view of a transport trailer illustrating the preferred embodiment of the present invention in diagrammatic form.

Looking now at the accompanying drawings and particularly at FIG. 1, a transport trailer according to the preferred embodiment of the present invention is illustrated in generally diagrammatic form and indicated generally at 10. The trailer 10 includes a box-like body 12 mounted to a frame 16. A generally planar cargo support surface 15 is disposed on the frame 16 within the confines of the body 12. A plurality of wheels 18 are mounted to the frame 16 for rolling movement of the transport trailer 10.

The body 12 is comprised primarily of a plurality of generally planar wall members 14 which are mounted to a plurality of upstanding, vertically oriented support members 20 which extend in spaced, generally parallel relation around the periphery of the cargo support surface 15 within the interior of the body 12, and extend from the cargo support surface 15 to the upper portion of the body 12. A plurality of spacer members 22 are mounted to the vertical support members 20 and extend therebetween, as is best seen in FIG. 2 and will be explained in greater detail hereinafter.

Figure 2:
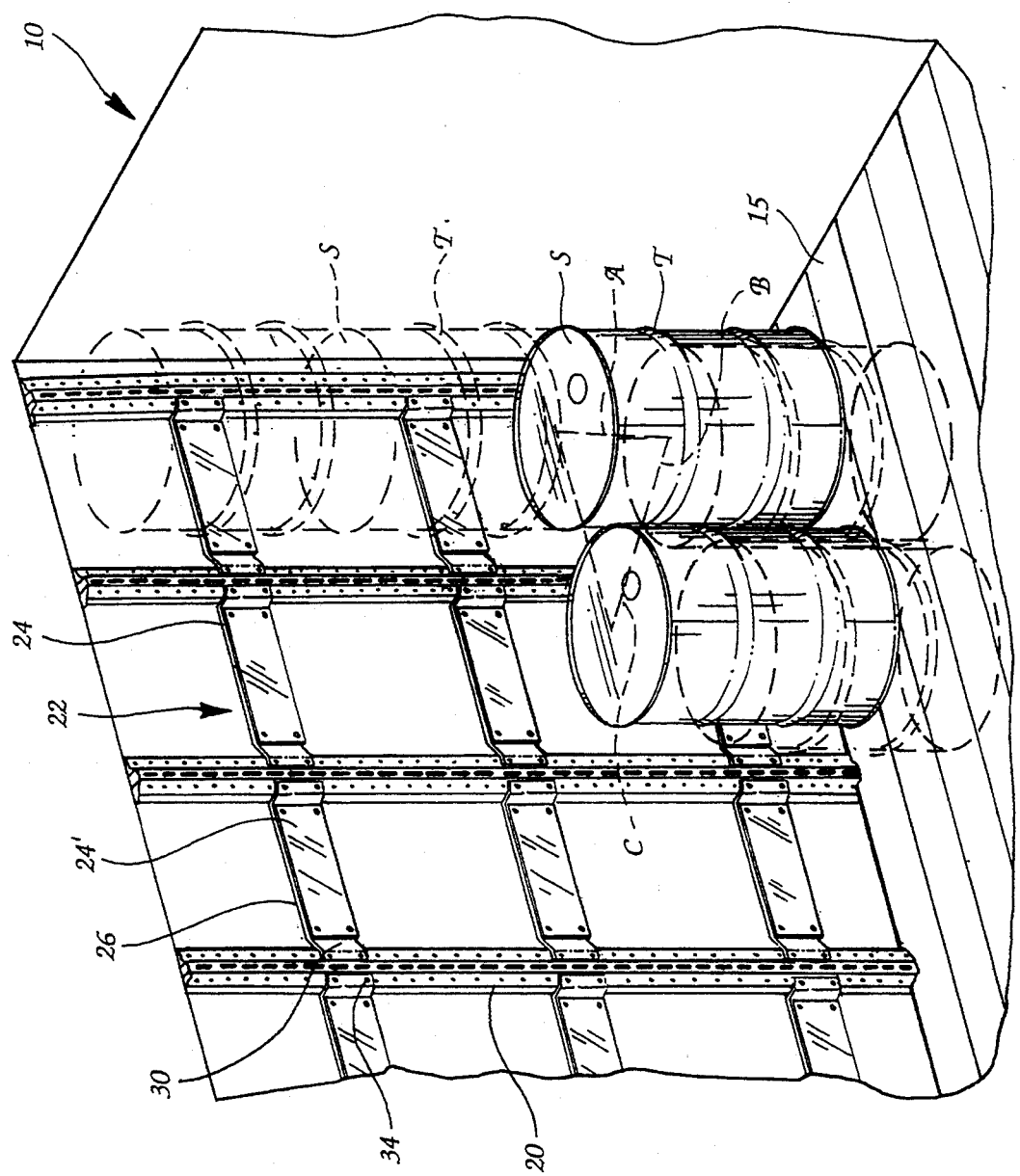
FIG. 2 is a perspective view of an interior corner of the transport trailer of FIG. 1 according to the preferred embodiment of the present invention.

As best seen in FIG. 2, the containers S for which the transport trailer of the present invention is designed to transport are formed as generally cylindrical barrels having two annular surfaces T projecting outwardly therefrom. The projecting surfaces T are formed in the side walls of the container S in generally parallel relation circumferentially about the midsection of the container and define a cylindrically planar region intermediate each projecting surface T. As discussed above, the annular projecting surfaces T are known in the trade as "hoops" and are provided so that a container may be laid on its side for rolling movement thereof. The primary concern of the present invention is to provide an improved apparatus and method for transporting empty containers from the manufacturer to the end user. Since the containers are new and are being transported to a customer, their appearance is important and they should arrive with few scratches and no substantial dents. However, it is to be understood that the present invention is not limited just to transporting new containers, and it may have other, similar applications as well.

Figure 4:
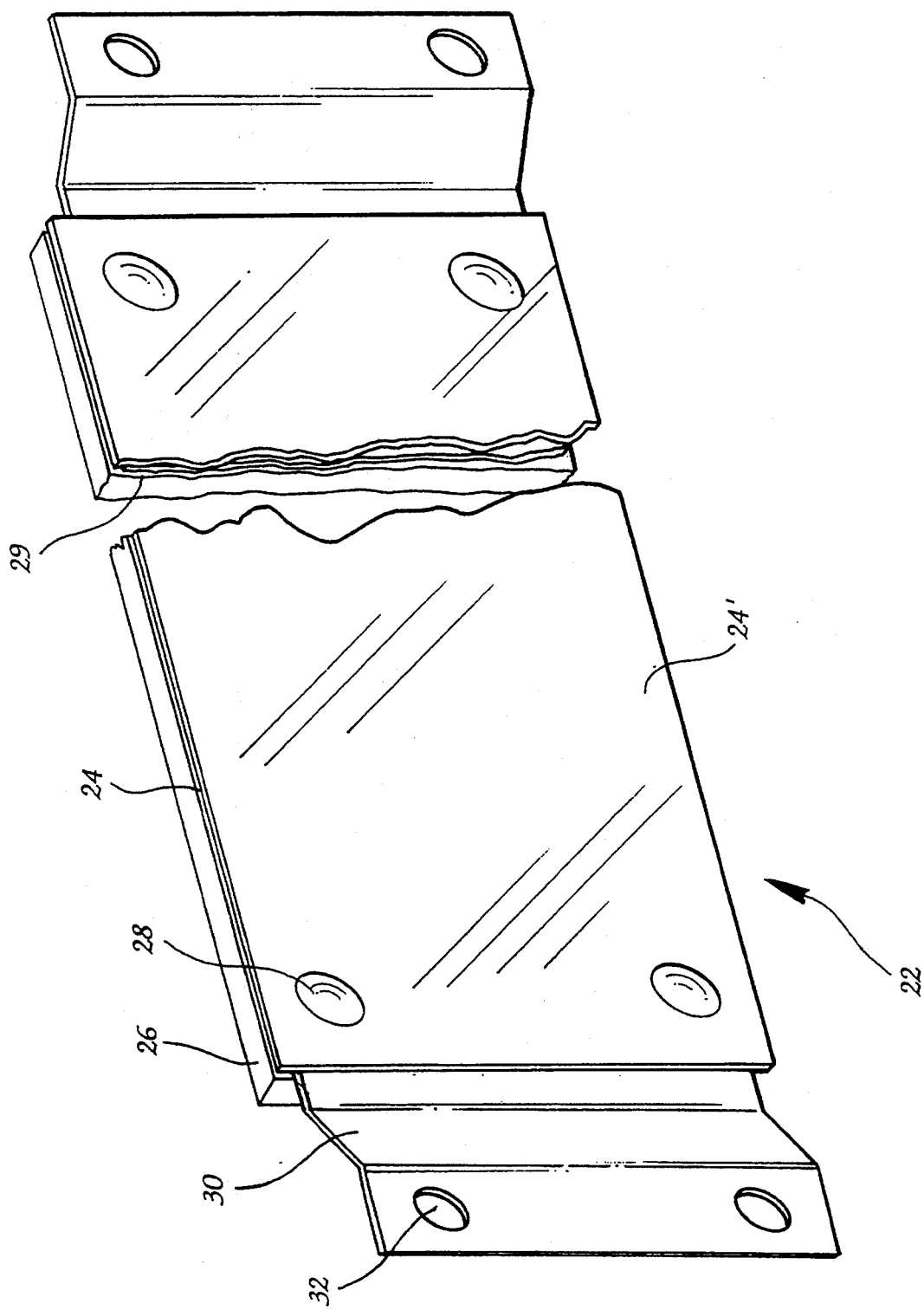
FIG. 4 is a perspective view of the spacer member of the present invention broken open to show its layered construction.

To prevent the containers loaded in a trailer from colliding with the walls of the trailer, which could damage either the trailer walls or the containers, or both, the plurality of spacer members 22 are mounted within the interior of the trailer 10. As best seen in FIG. 4, the spacer members 22 comprise a relatively rigid backing plate 26 having a container contact plate 24 mounted thereto in generally parallel relation therewith. A rigid reinforcement plate 29 is mounted intermediate the container contact plate 24 and the backing plate 26. The container contact plate 24, the reinforcement plate 29 and the backing plate 26 are all formed with a width less than the distance between the annular projecting surfaces T of the containers S and are retained in a mated configuration using conventional rivets 28.

Mounting flanges 30 are formed integrally at each end of the reinforcement plate 29 and project outwardly from the sides of the container contact member 22. The mounting flanges 30 diverge away from the container contact plate 24 for a short distance and then diverge into generally parallel relation with the container contact plate 24. The foregoing divergence is provided to conform the mounting flange 30 with the general shape of the sides of the vertical support members 20, as seen in FIG. 2. The mounting flanges 30 include a plurality of openings 32 formed therein for mounting the spacer members 22 to the vertical support members 20.

The container contact plate 24 includes a container contact surface 24' which is formed of a material that is sufficiently smooth so that the containers may engage the spacer members 22 with little or no abrasion of the container surface. The container contact surface 24' may be formed of Ultra High Molecular Weight Polyethylene which is commercially available as Ethylux. While UHMWPE, as it is known in the trade, is the preferred material, it will be understood by those skilled in the art that other forms of plastic may be equally suitable to form the container contact surface 24'.

Referring now to FIG. 2, the spacer members 22 are mounted to the trailer 10 on the vertical support members 20 and extend therebetween at a position sufficient to engage the containers S in the region intermediate the annular projecting surfaces T. Conventional bolts 34 are fitted to the openings 32 in the mounting flange 30 and are attached to the vertical support members 20. A plurality of spacer members 22 are disposed in spaced vertical relation to one another along the vertical support members 20 at different heights h,i,j, as seen in FIG. 1, corresponding to the position of the intermediate regions of containers on the cargo surface 15, and to the containers S stacked two and three deep, respectively. The containers S may thus be stacked, as shown in FIG. 2, with the container contact surfaces 24 of the respective spacer members engaging the stacked containers S in the region intermediate the annular projecting surfaces T.

Figure 3:
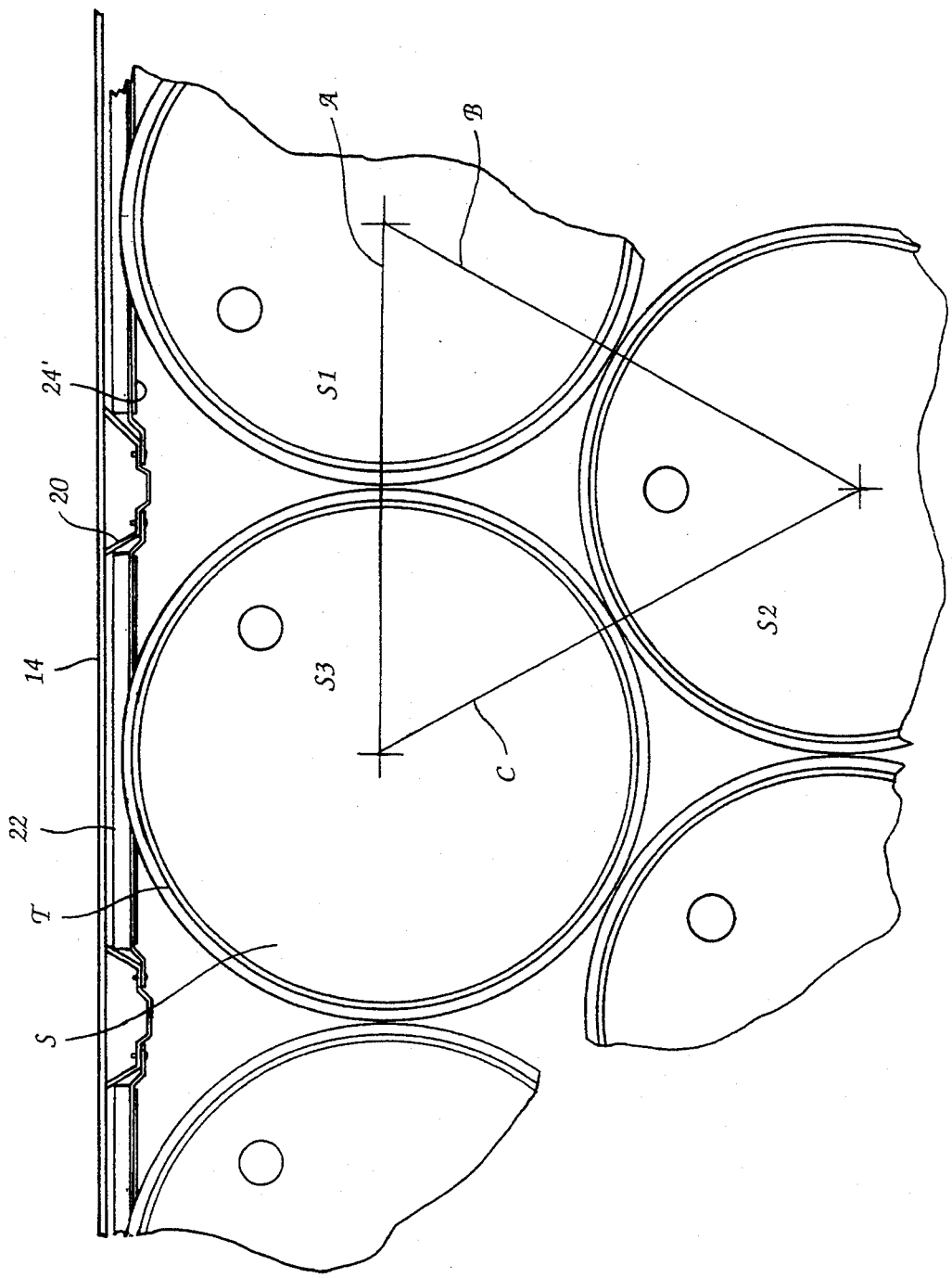
FIG. 3 is a top plan view of a portion of a plurality of containers loaded onto a transport trailer.

As best seen in FIG. 3, the spacer members 22 are mounted to the vertical support members in such a configuration that the container contact surface 24' is spaced a distance away from the inner wall 14 of the trailer 10 which is greater than the distance the annular projecting surfaces T project away from the container walls. This spacing of the container contact surface 24' ensures that the annular projecting surfaces T of the container S do not contact the trailer wall members 14 and the spacing is controlled by the thickness of the backing plate 24 in combination with the angle of deflection of the angular mounting flange 30 and the container contact plate 24. The annular projecting surfaces T of container S1 in FIG. 3 are shown partially broken away to illustrate the manner in which a spacer member 22 engages a container S1.

In operation, and according to the method of the present invention, a plurality of containers S are loaded onto the cargo support surface 15 within the body 12 of the trailer 10 in a manner wherein the containers are in abutment with the container contact surfaces 24' in a region of the container intermediate the annular projecting surfaces T. The containers are arranged on the cargo support surface 15 in a generally staggered predetermined pattern. As best seen in FIG. 3, the pattern is defined with the containers S being arranged in rows and each container S within a row being aligned. Each row is disposed in spaced parallel relation to an adjacent row such that imaginary lines connecting the centers of any two containers S in a row and the center of the container S in an adjacent row which is closest to such two containers S form an equilateral triangle. As illustrated in FIG. 3 by containers S1, S2 and S3, lines A–B equals line A–C which in turn equals line B–C forming an equilateral triangle ABC. The pattern repeats itself throughout the container arrangement.

As can be seen in FIG. 2, the containers S are stacked on top of one another with their side walls in abutment with spacer members 22 which are disposed in spaced vertical relation as previously described. The arrangement of the containers S within the body 12 of a trailer provides a minimum of spacing between the containers which helps to prevent their movement during transportation thereof. While modern trailers are configured to provide a smooth ride for the contents thereof, road vibrations still occur and, since the containers are empty and therefore relatively light, the road vibration tends to urge the containers S against one another and the container contact surfaces 24' of the spacer members 22. This movement is minimized by the minimization of spacing between the containers S due to the pattern of arrangement of the containers S and the maintenance of this pattern by the spacer members 22 holding the containers S in place. In addition, the smooth container contact surfaces 24' helps to prevent damage to the container surfaces as well as preventing damage to the walls of the trailer due to impact by the containers.

By the present invention, relatively large cylindrical containers can be transported from the manufacturer to the end user with little or no damage to the containers or to the transport trailer. Further, the present invention allows a conventional transport trailer to be converted for transport of the cylindrical containers while still allowing the trailer to be used for other cargo as necessary.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a transport trailer of the type having a generally planar covered cargo support surface for mounting to a plurality of wheels for rolling movement thereof, the cover being generally box-like and including a plurality of generally planar, vertically oriented wall members supported by a plurality of upstanding support members disposed around the periphery of the support surface in spaced generally parallel relation, the improvement enhancing the ability of the trailer to transport generally cylindrical storage containers of the type having at least two annular raised ring-like surfaces projecting a predetermined distance outwardly from the sides of the containers in spaced parallel relation to each other and to the ends of the container, the improvement comprising a plurality of spacer devices disposed intermediate the upstanding support members and extending in a generally parallel relationship with the wall members, each said spacer device having a planar container contact surface spaced a predetermined distance away from the trailer wall members, said predetermined distance being greater than the predetermined projection distance of the annular projecting surfaces, said spacer devices being configured and positioned to contact individual containers intermediate the annular projecting surfaces for positioning the containers closely adjacent the trailer wall members without contact between the trailer wall members and the containers and for retaining the containers in a predetermined arrangement within the trailer.

2. An improved transport trailer according to claim 1 wherein said container contact surface is formed of a material which is sufficiently smooth to permit the containers to move thereacross in contact therewith with substantially no degradation of the surface appearance of the container.

3. In a transport trailer of the type having a generally planar covered cargo support surface for mounting to a plurality of wheels for rolling movement thereof, the cover being generally box-like and including a plurality of generally planar, vertically-oriented wall members supported by a plurality of upstanding support members disposed around the periphery of the support surface in spaced generally parallel relation, the improvement enhancing the ability of the trailer to transport generally cylindrical storage containers of the type having at least two annular raised ring-like surfaces projecting a predetermined distance outwardly from the sides of the containers in spaced parallel relation to each other and to the ends of the container, the improvement comprising a plurality of spacer devices disposed intermediate the upstanding support members, each spacer device having a container contact surface spaced a predetermined distance away from the trailer wall members, said predetermined distance being greater than the predetermined projection distance of the annular projecting surfaces, said spacer devices including a plate having said container contact surface affixed thereto, and a flange projecting from each end thereof, each flange being adapted for mounting to a vertical support member with said plate extending therebetween in a disposition sufficient to engage an individual container intermediate the annular projecting surfaces for positioning the containers closely adjacent the trailer wall members without contact between the trailer wall members and the containers and for retaining the containers in a predetermined arrangement within the trailer.

4. An improved transport trailer according to claim 3 wherein a plurality of said plates are disposed within the interior of the trailer to extend between the vertical support members at positions corresponding to the area intermediate the annular projecting surfaces of a plurality of containers positioned in a predetermined arrangement.

5. An improved transport trailer according to claim 4 wherein said predetermined arrangement includes positioning the containers on the cargo support surface in a staggered pattern arrangement for minimizing the space between adjacent containers.

6. An improved transport trailer according to claim 5 wherein said staggered pattern arrangement includes containers arranged in a plurality of adjacent rows with each row being disposed in spaced parallel relation to an adjacent row such that imaginary lines connecting the centers of any two containers and the center of the container in an adjacent row which is closest to said two containers form an equilateral triangle, thereby equalizing the space between all said containers within the trailer and maximizing the number of containers that can be transported in the trailer.

7. A method for loading and transporting generally cylindrical storage containers of the type having at least two annular raised ring-like surfaces projecting a predetermined distance outwardly from the sides of the container in spaced parallel relation to each other and to the ends of the container in transport trailers of the type having a generally planar covered cargo support surface for mounting to a plurality of wheels for rolling movement thereof, the cover being generally box-like and including a plurality of generally planar, vertically oriented wall members supported by a plurality of upstanding support members disposed around the periphery of the support surface in spaced, generally parallel relation, said method comprising the steps of:

mounting a plurality of spacer devices, each having a planar container contact surface to the vertical support members to extend therebetween in a generally parallel relationship with the wall members at a disposition sufficient to engage individual containers intermediate the annular projecting surfaces to prevent the containers from abutting the trailer wall members; and arranging a plurality of containers within the trailer in a predetermined staggered pattern with the area of the containers intermediate the annular projecting surfaces in abutment with said spacer means, and with no significant spacing between adjacent containers to thereby substantially prevent movement of the containers during transportation thereof to a destination.

8. A method for loading and transporting generally cylindrical storage containers according to claim 7 wherein the step of arranging the containers in a predetermined staggered pattern includes positioning the containers on the support surface in a plurality of adjacent rows with each row being disposed in spaced parallel relation to an adjacent row such that imaginary lines connecting the centers of any two containers in a row and the center of the container in an adjacent row which is closest to said two containers form an equilateral triangle, thereby substantially eliminating the space between all said containers within the trailer, maximizing the number of containers that can be transported in a trailer and, in cooperation with said spacer devices, substantially preventing movement of the containers.

9. A method for loading and transporting generally cylindrical storage containers according to claim 8 and further comprising the steps of mounting a second plurality of spacer devices to the vertical support members in spaced vertical relation with said other plurality of spacer devices and stacking a second plurality of containers on the first plurality of containers, in a disposition wherein said second plurality of spacer devices can abut a portion of the second plurality of containers intermediate the annular projecting surfaces thereof.

10. In a transport trailer of the type having a generally planar covered cargo support surface for mounting to a plurality of wheels for rolling movement thereof, the cover being generally box-like and including a plurality of generally planar, vertically oriented wall members supported by a plurality of upstanding support members disposed around the periphery of the support surface in spaced generally parallel relation, the improvement enhancing the ability of the trailer to transport generally cylindrical storage containers of the type having at least two annular raised ring-like surfaces projecting a predetermined distance outwardly from the sides of the containers in spaced parallel relation to each other and to the ends of the container, the improvement comprising a plurality of spacer members disposed intermediate the upstanding vertical support members and having a container contact surface spaced a predetermined distance away from the trailer wall members, said predetermined distance being greater than the predetermined projection distance of the annular projecting surfaces, said spacer members being configured and positioned to contact the containers intermediate the annular projecting surfaces, said spacer members including a plate having said container contact surface affixed thereto, and a flange projecting from each end thereof, each flange being mounted to a vertical support member with said plate extending therebetween, said container contact surface being formed of a material which is sufficiently smooth to permit the containers to move thereacross in contact therewith with substantially no degradation of the surface appearance of the containers, said containers being positioned in a predetermined staggered pattern arrangement with the containers arranged in a plurality of adjacent rows with each row being disposed in spaced parallel relation to an adjacent row such that imaginary lines connecting the centers of any two containers and the center of the container in an adjacent row which is closest to said two containers form an equilateral triangle, thereby substantially eliminating the space between all said containers within the trailer and maximizing the number of containers that can be transported in the trailer with substantially no movement of the container within the trailer.

* * * * *